(12) United States Patent
Sato et al.

(10) Patent No.: US 11,319,948 B2
(45) Date of Patent: May 3, 2022

(54) COMPRESSED AIR ENERGY STORAGE GENERATOR

(71) Applicant: KOBE STEEL, LTD., Hyogo (JP)

(72) Inventors: Takashi Sato, Takasago (JP); Ryo Nakamichi, Takasago (JP); Masaki Matsukuma, Takasago (JP); Hiroki Saruta, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 456 days.

(21) Appl. No.: 16/603,528

(22) PCT Filed: Apr. 10, 2018

(86) PCT No.: PCT/JP2018/015067
§ 371 (c)(1),
(2) Date: Oct. 7, 2019

(87) PCT Pub. No.: WO2018/198755
PCT Pub. Date: Nov. 1, 2018

(65) Prior Publication Data
US 2020/0325891 A1  Oct. 15, 2020

(30) Foreign Application Priority Data

Apr. 26, 2017  (JP) .............................. JP2017-087526

(51) Int. Cl.
*F04B 49/06* (2006.01)
*F01C 20/02* (2006.01)
(Continued)

(52) U.S. Cl.
CPC .............. *F04B 49/06* (2013.01); *F01C 20/02* (2013.01); *H02J 15/006* (2013.01); *H02P 27/06* (2013.01)

(58) Field of Classification Search
CPC ......... F01C 20/02; F04B 49/06; H02J 15/006; H02P 27/06
See application file for complete search history.

(56) References Cited

U.S. PATENT DOCUMENTS 6,419,454 B1   7/2002  Christiansen
2006/0257265 A1  11/2006  Pettersson
(Continued)

FOREIGN PATENT DOCUMENTS

JP   2002-098061 A    4/2002
JP   2013-231396 A   11/2013
(Continued)

OTHER PUBLICATIONS

English translation of foreign reference JP 2016-220350 (Year: 2016).*
(Continued)

*Primary Examiner* — Patrick Hamo
(74) *Attorney, Agent, or Firm* — Studebaker & Brackett PC (57) ABSTRACT

A CAES generator includes a plurality of motors, a plurality of compressors, a pressure accumulator, an expander, a generator, an electric-motor inverter that changes a rotation speed of each of the motors, a feed command receiver that receives input power as a feed command value before feeding the input power, and a controller. The controller includes a compressor number calculation unit that calculates a maximum number of motors that are allowed to be driven at a rating based on the feed command value, and a compressor drive control unit that drives at the rating, the motors, the number of which is the maximum number calculated by the compressor number calculation unit.

12 Claims, 3 Drawing Sheets

(51) Int. Cl.
    *H02J 15/00*     (2006.01)
    *H02P 27/06*     (2006.01)

(56) References Cited

U.S. PATENT DOCUMENTS

| | | | |
|---|---|---|---|
| 2013/0287592 A1 | 10/2013 | Kobayashi et al. | |
| 2014/0020369 A1* | 1/2014 | Guidati | F02C 6/14 |
| | | | 60/415 |
| 2017/0159649 A1 | 6/2017 | Sakamoto et al. | |
| 2017/0284336 A1* | 10/2017 | Sakamoto | F02G 1/045 |
| 2018/0128167 A1* | 5/2018 | Matsukuma | F01D 17/08 |
| 2020/0083743 A1* | 3/2020 | Sato | H02K 7/1823 |
| 2021/0003031 A1* | 1/2021 | Nakamichi | H02P 29/60 |
| 2021/0388854 A1* | 12/2021 | Sato | H02J 15/006 |

FOREIGN PATENT DOCUMENTS

| | | | |
|---|---|---|---|
| JP | 2016-034211 A | 3/2016 | |
| JP | 2016-220350 A | 12/2016 | |

OTHER PUBLICATIONS

International Preliminary Report on Patentability and Written Opinion issued in PCT/JP2018/015067; dated Nov. 7, 2019.

The extended European search report issued by the European Patent Office dated Nov. 18, 2020, which corresponds to European Patent Application No. 18791626.7-1004 and is related to U.S. Appl. No. 16/603,528.

* cited by examiner

COMPRESSED AIR ENERGY STORAGE GENERATOR

CROSS-REFERENCE TO RELATED APPLICATIONS

This is a national phase application in the United States of International Patent Application No. PCT/JP2018/015067 with an international filing date of Apr. 10, 2018, which claims priority of Japanese Patent Application No. 2017-087526 filed on Apr. 26, 2017 the contents of which are incorporated herein by reference.

TECHNICAL FIELD

The present invention relates to a compressed air energy storage generator.

BACKGROUND ART

Power generation using renewable energy such as wind power or solar power depends on weather conditions, so the output may not be stable. Therefore, it is necessary to use an energy storage system in order to obtain necessary power at any time. As an example of such a system, a compressed air energy storage (CAES) generator is known, for example.

The CAES generator drives a compressor with renewable energy to produce compressed air and stores the compressed air in a tank or the like, and then drives a turbine generator with the compressed air to generate power on an as-needed basis. Such a CAES generator is disclosed, for example, in JP 2016-34211 A.

Patent Document 1: JP 2016-34211 A

SUMMARY OF THE INVENTION

Problems to be Solved by the Invention

The CAES generator disclosed in JP 2016-34211 A includes pluralities of compressors and expanders. However, no specific description has been given of a method for changing respective rotation speeds of the pluralities of compressors and expanders to increase operation efficiency in a case where the pluralities of compressors and expanders are provided.

It is an object of the present invention to increase operation efficiency of a compressed air energy storage generator including a plurality of compressors or expanders by changing respective rotation speeds of the compressors or expanders.

Means for Solving the Problems

A compressed air energy storage generator according to one aspect of the present invention includes a plurality of electric motors configured to be driven with input power that fluctuates, a plurality of compressors configured to be driven by the electric motors to compress air, a pressure accumulator configured to hold the compressed air discharged from the compressors, an expander configured to be driven with the compressed air supplied from the pressure accumulator, a generator configured to be driven by the expander to supply output power to a consumer facility, an electric-motor inverter configured to change a rotation speed of each of the electric motors, a feed command receiver configured to receive the input power as a feed command value before feeding the input power, and a controller including a compressor number calculation unit and a compressor drive control unit, the compressor number calculation unit being configured to calculate a maximum number of electric motors that are allowed to be driven at a rating based on the feed command value, the compressor drive control unit being configured to drive at the rating, the electric motors, a number of which is the maximum number calculated by the compressor number calculation unit.

According to this configuration, it is possible to store energy (input power) such as renewable energy whose output fluctuates irregularly in the pressure accumulator in the form of compressed air and to supply the compressed air to the expander on an as-needed basis to drive the generators to generate power. Hereinafter, a process of causing the compressors to produce the compressed air and storing the compressed air in the pressure accumulator is also referred to as charging, and a process of causing the generator to generate power from the compressed air stored in the pressure accumulator is also referred to as discharging. In particular, it is possible to cause the compressor number calculation unit to calculate the maximum number of electric motors that are allowed to be driven at the rating based on the feed command value and to cause the compressor drive control unit to drive electric motors, the number of which is the maximum number, at the rating. Herein, "rating" and "rated" each denote a state in which the electric motors can be driven in an appropriate state, and, more specifically, denote a state in which the electric motors are driven, for example, at a practically allowable maximum rotation speed. Therefore, since the maximum number of electric motors to be driven at the appropriate rating can be secured, it is possible to increase charging efficiency (operation efficiency) of the compressed air energy storage (CAES) generator. Further, since the outputs of electric motors, the number of which is the maximum number, are made constant with respect to the fluctuating input power, it is possible to make the numbers of compressors and electric motors whose outputs fluctuate smaller, and thus stable operation becomes possible.

The controller may further include a remaining input power calculation unit and a feed control unit, the remaining input power calculation unit being configured to subtract power required to drive the electric motors, the number of which is the maximum number, from the input power indicated by the feed command value to obtain remaining input power, the feed control unit being configured to allocate, when the remaining input power is smaller than power corresponding to a minimum rotation speed of one of the electric motors, some of the input power to be supplied to another one of the electric motors to be driven at the rating to the remaining input power to drive the one of the electric motors at the minimum rotation speed or higher.

According to this configuration, it is possible to cause the remaining input power calculation unit to calculate the remaining input power and to cause the feed control unit to make the remaining input power equal to or greater than the power corresponding to the minimum rotation speed of one of the electric motors, and thus it is possible to prevent failure in driving by the remaining input power and use the remaining input power effectively. Herein, the power corresponding to the minimum rotation speed of one of the electric motors refers to power required to rotate the one of the electric motors at the minimum rotation speed. In a case where such control is not performed, and the remaining input power is less than the above-described power corresponding to the minimum rotation speed, even when the remaining input power is supplied to the one of the electric motors, the rotation speed of the electric motor is less than the minimum allowable rotation speed, which fails to drive the electric motor and in turn wastes the remaining input power. In particular, since the remaining input power fluctuates along with the fluctuation of the input power, it is preferable for the CAES generator to be capable of effectively using the remaining input power in such a wide range.

The feed control unit may allocate, to the remaining input power, some of the input power to be supplied to the other one of the electric motors to be driven at the rating so as to make the remaining input power larger by predetermined power than the power corresponding to the minimum rotation speed of the one of the electric motors.

According to this configuration, the remaining input power is larger by the predetermined power than the power corresponding to the minimum rotation speed of the one of the electric motors, so that, even when the remaining input power decreases along with a decrease in the feed command value, the remaining input power does not immediately fall below the above-described power corresponding to the minimum rotation speed. Specifically, the remaining input power does not fall below the above-described power corresponding to the minimum rotation speed until the feed command value decreases by a value corresponding to the predetermined power. Therefore, even when the feed command value decreases, the electric motor driven with the remaining input power is not immediately stopped, and thus stable operation becomes possible.

The controller may further include a control unit for leveling compression configured to control the electric-motor inverter to level off drive times of the plurality of electric motors.

According to this configuration, since the drive times of the compressors and the electric motors can be leveled off by the control unit for leveling compression, it is prevented that only specific compressors and electric motors are driven and deteriorated. The configuration as described above where the compressors and the electric motor to be driven are switched as needed tends to cause variations in drive time among the compressors and the electric motors, and thus such a technique for allowing the drive times to be leveled off is particularly effective.

A compressed air energy storage generator according to one aspect of the present invention includes an electric motor configured to be driven with input power, a compressor configured to be driven by the electric motor to compress air, a pressure accumulator configured to hold the compressed air discharged from the compressor, a plurality of expanders configured to be driven with the compressed air supplied from the pressure accumulator, a plurality of generators configured to be driven by the expanders to supply, to a consumer facility, output power that fluctuates, a generator inverter configured to change a rotation speed of each of the generators, a discharge command receiver configured to receive, from the consumer facility, demand power as a discharge command value before outputting the output power, and a controller including an expander number calculation unit and an expander drive control unit, the expander number calculation unit being configured to calculate a maximum number of generators that are allowed to be driven at a rating based on the discharge command value, the expander drive control unit being configured to drive at the rating, the generators, a number of which is the maximum number calculated by the expander number calculation unit.

According to this configuration, the compressed air is stored in the pressure accumulator, and then the compressed air is supplied to the expanders on an as-needed basis to drive the generator to generate the output power that fluctuates, making it possible to compensate for energy such as renewable energy whose output fluctuates irregularly. In particular, it is possible to cause the expander number calculation unit to calculate the maximum number of generators that are allowed to be driven at the rating based on the discharge command value and to cause the expander drive control unit to drive the generators, the number of which is the maximum number, at the rating. Herein, "rating" and "rated" each denote a state in which the generators can be driven in an appropriate state, and, more specifically, denote a state in which the generators are driven, for example, at a practically allowable maximum rotation speed. Therefore, since the maximum number of generators to be driven at the rating in an appropriate state can be secured, it is possible to increase the discharging efficiency (operation efficiency) of the CAES generator. Further, since the outputs of the generators, the number of which is the maximum number, are made constant with respect to the fluctuating output power, it is possible to make the number of generators whose outputs fluctuate smaller, and thus stable operation becomes possible.

The controller may further include a remaining demand power calculation unit and a discharge control unit, the remaining demand power calculation unit being configured to subtract output power obtained by driving the generators, the number of which is the maximum number, from the demand power indicated by the demand command value to obtain remaining demand power, the discharge control unit being configured to allocate, when the remaining demand power is smaller than power corresponding to a minimum rotation speed of one of the generators, some of the demand power to be output by another one of the generators to be driven at the rating to the remaining demand power to drive the one of the generators at the minimum rotation speed or higher.

According to this configuration, it is possible to cause the remaining demand power calculation unit to calculate the remaining demand power and to cause the discharge control unit to make the remaining demand power equal to or greater than the power corresponding to the minimum rotation speed of one of the generators, and thus power corresponding to the remaining demand power can be accurately output. Herein, the power corresponding to the minimum rotation speed of one of the generators refers to power obtained by driving the generator at the minimum rotation speed. In a case where such control is not performed, and the remaining demand power is less than the above-described power corresponding to the minimum rotation speed, even when the generator is driven at the minimum rotation speed, power exceeding the remaining demand power is generated, and thus surplus power with respect to the discharge command value is developed. In particular, since the remaining demand power fluctuates with the condition of the consumer facility, it is preferable for the CAES generator to be capable of handling such a wide range of remaining demand power.

The discharge control unit may allocate, to the remaining demand power, some of the demand power to be output by the other one of the generators to be driven at the rating so as to make the remaining demand power larger by predetermined power than the power corresponding to the minimum rotation speed of the one of the generators.

According to this configuration, the remaining demand power is larger by the predetermined power than the power corresponding to the minimum rotation speed of the one of the generators, so that, even when the discharge command value decreases, the remaining demand power does not immediately fall below the above-described power corresponding to the minimum rotation speed. Specifically, the remaining demand power does not fall below the above-described power corresponding to the minimum rotation speed until the discharge command value decreases by a value corresponding to the predetermined power. Therefore, even when the discharge command value decreases, the generator driven with the remaining demand power indicated by the discharge command value is not immediately stopped, and thus stable operation becomes possible.

The controller may further include an control unit for leveling expansion configured to control the generator inverter to level off drive times of the plurality of generators.

According to this configuration, since the drive times of the expanders and the generators can be leveled off by the control unit for leveling expansion, it is prevented that only specific expanders and generators are driven and deteriorated. The configuration as described above where the expanders and the generators to be driven are switched as needed tends to cause variations in drive time among the expanders and the generators, and thus such a technique for allowing the drive times to be leveled off is particularly effective.

According to the present invention, in the compressed air energy storage generator including a plurality of compressors or expanders, the respective rotation speeds of the compressors or expanders are suitably controlled, thereby increasing the operation efficiency.

MODE FOR CARRYING OUT THE INVENTION

Hereinafter, a description will be given of an embodiment of the present invention with reference to the accompanying drawings.

Figure 1:
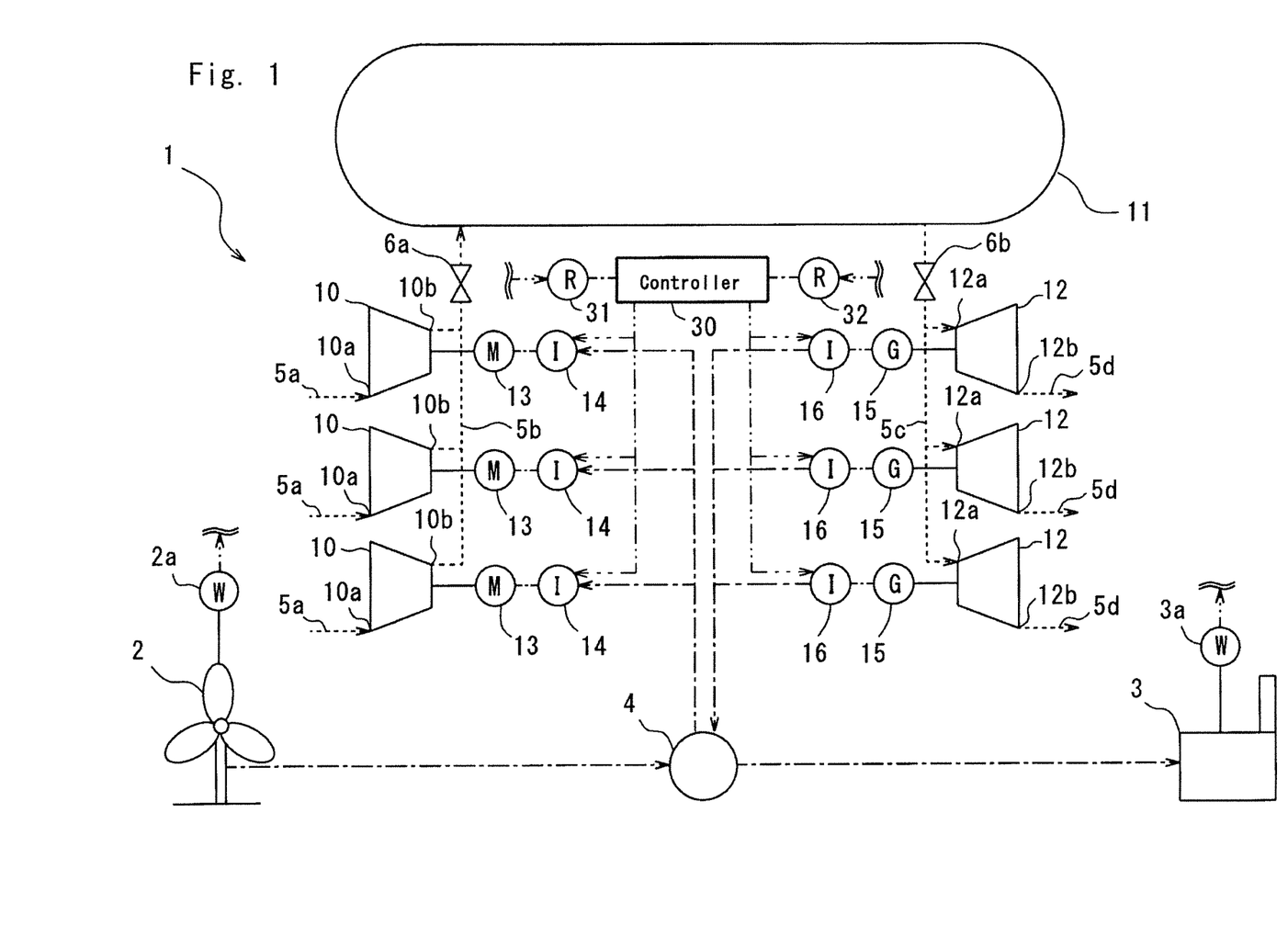
FIG. 1 is a schematic configuration diagram of a compressed air energy storage generator according to an embodiment of the present invention.

A compressed air energy storage (CAES) generator 1 shown in FIG. 1 holds, in the form of compressed air, power generated by a power generation facility 2 using renewable energy such as wind power generation or solar power generation, and generates, on an as-needed basis, power using the compressed air to supply the power to a consumer facility 3 such as a factory.

According to the present embodiment, the power generation facility 2 is provided with a feed command transmitter 2a. The feed command transmitter 2a transmits a feed command value to the CAES generator 1. Further, the consumer facility 3 is provided with a discharge command transmitter 3a. The discharge command transmitter 3a transmits a discharge command value to the CAES generator 1. Herein, the feed command value indicates power with which the CAES generator 1 is charged (input power to be described later) of power generated by the power generation facility 2, and the discharge command value indicates power the consumer facility 3 demands from the CAES generator 1 (demand power to be described later). As described later, the CAES generator 1 performs necessary charging and discharging based on the feed command value and the discharge command value. Although the feed command transmitter 2a is attached to the power generation facility according to this embodiment, the feed command transmitter 2a need not necessarily be attached to the power generation facility 2 and may be installed at another location in a power system such as a substation.

The CAES generator 1 includes a plurality of compressors 10, a pressure accumulation tank (pressure accumulator) 11, and a plurality of expanders 12. According to the present embodiment, three compressors 10 and three expanders 12 are deployed. A motor (electric motor) 13 is mechanically connected to each of the compressors 10. An electric-motor inverter 14 is electrically connected to each of the motors 13. Further, a generator 15 is mechanically connected to each of the expanders 12. A generator inverter 16 is electrically connected to each of the generators 15.

Power generated by the power generation facility 2 using renewable energy is supplied to the motors 13 via a power transmission and reception facility 4 and the electric-motor inverters 14. Hereinafter, the power supplied from the power generation facility 2 to the motors 13 is referred to as input power.

The compressors 10 of the present embodiment are of a screw type. Therefore, the compressors 10 of the present embodiment each includes a pair of screw rotors (not shown) in the compressor 10, and the pair of screw rotors are mechanically connected to a corresponding one of the motors 13. Note that the compressors 10 are not limited to the screw type, and may be, for example, of a turbo type, a scroll type, or a reciprocating type. However, the compressors 10 of the screw type are suitable as components of the CAES generator 1 because such a compressor has a rotation speed control capability and thus is capable of responding, with high responsiveness, to the input power that irregularly fluctuates. Further, although the configuration where three compressors 10 are provided has been given as an example in the present embodiment, the number of compressors 10 is not limited to three.

An intake port 10a of each of the compressors 10 communicates with outside air through air piping 5a. A discharge port 10b of each of the compressors 10 is fluidly connected to the pressure accumulation tank 11 through air piping 5b. A valve 6a is attached to the air piping 5b and is capable of allowing or blocking a flow of air.

Upon being supplied with the input power, each of the motors 13 is actuated to rotate the above-described screw rotors to drive a corresponding one of the compressors 10. Each of the compressors 10 draws in air from the intake port 10a through the air piping 5a, compresses and discharges the air from the discharge port 10b, and pressure-feeds the compressed air to the pressure accumulation tank 11 through the air piping 5b.

The pressure accumulation tank 11 is, for example, a steel tank, and holds the compressed air pressure-fed from each of the compressors 10. The pressure accumulation tank is fluidly connected to the expanders 12 through air piping 5c, and the compressed air stored in the pressure accumulation tank 11 is supplied to the expanders 12 through the air piping 5c. Further, a valve 6b is attached to the air piping 5c and is capable of allowing or blocking a flow of air.

The expanders 12 of the present embodiment is of a screw type. Therefore, the expanders 12 of the present embodiment each includes a pair of screw rotors (not shown), and the pair of screw rotors are mechanically connected to a corresponding one of the generators 15. Note that the expanders 12 are not limited to the screw type, and may be, for example, of a turbo type, a scroll type, or a reciprocating type. However, the expanders 12 of the screw type are suitable as components of the CAES generator 1 because such an expander has a rotation speed control capability and thus is capable of responding, with high responsiveness, to the demand power that fluctuates. Further, although the configuration where three expanders 10 are provided has been given as an example in the present embodiment, the number of expanders is not limited to three.

As described above, an inlet port 12a of each of the expanders 12 is fluidly connected to the pressure accumulation tank 11 through the air piping 5c. An outlet port 12b of each of the expanders 12 is open to outside air through air piping 5d.

When the compressed air is supplied to each of the expanders 12, the above-described screw rotors rotates to drive a corresponding one of the expanders 12, that is, to drive a corresponding one of the generators 15. Air (exhaust air) expanded by each of the expanders 12 is exhausted to outside air from a corresponding one of the outlet ports 12b through the air piping 5d.

The generators 15 are driven by the expanders 12 to generate power. Each of the generators 15 is electrically connected to the power consumer facility 3 such as a village, a target area for district heating and cooling, a large scale shopping center, a substation, or a factory, and the power generated by each of the generators 15 is supplied to such a consumer facility 3.

Further, the CAES generator 1 includes a controller 30. The controller 30 includes hardware including a central processing unit (CPU) and storage devices such as a random access memory (RAM) and a read only memory (ROM), and software implemented in the hardware.

Figure 2:
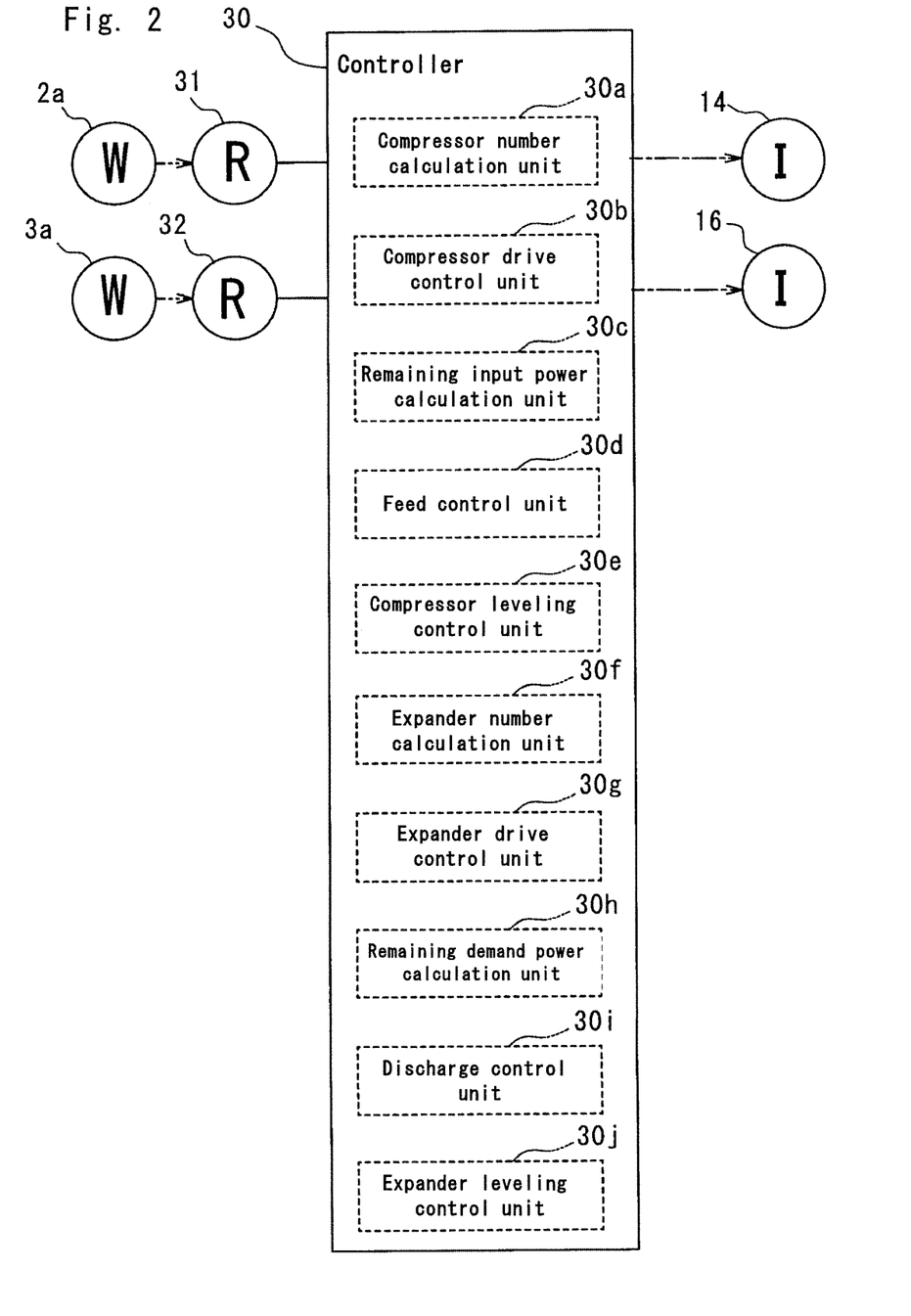
FIG. 2 is a control block diagram of the compressed air energy storage generator according to the embodiment.

As shown in FIGS. 1 and 2, a feed command receiver 31 and a discharge command receiver 32 are electrically connected to the controller 30. Upon receiving the feed command value from the feed command transmitter 2a, the feed command receiver 31 transfer the feed command value to the controller 30. Upon receiving the discharge command value from the discharge command transmitter 3a, the discharge command receiver 32 transfers the discharge command value to controller 30. The controller 30 controls each of the electric-motor inverters 14 based on the feed command value, and controls each of the generator inverters 16 based on the discharge command value.

The controller 30 of the present embodiment includes a compressor number calculation unit 30a, a compressor drive control unit 30b, a remaining input power calculation unit 30c, a feed control unit 30d, a control unit for leveling compression 30e, an expander number calculation unit 30f, an expander drive control unit 30g, a remaining demand power calculation unit 30h, a discharge control unit 30i, and an control unit for leveling expansion 30j.

The compressor number calculation unit 30a calculates a maximum number of motors 13 that are allowed to be driven at a rating based on the feed command value. Specifically, a largest integer Nc that satisfies the following Inequality (1) is obtained. For example, in a case where information representing that input power Win is 90 kW is received as the feed command value, when rated power WcR of each of the combinations of the compressors 10 and the motors 13 is 40 kW, the resultant maximum number Nc becomes 2. Herein, "rating" and "rated" each denote a state in which the motors 13 can be driven in an appropriate state (in one example, with optimum efficiency), and, more specifically, denote a state in which the motors 13 are driven, for example, at a practically allowable maximum rotation speed.

[Math. 1]

$$Win - WcR \times Nc > 0 \qquad (1)$$

where Win denotes the input power, and
WcR denotes the rated power.

The compressor drive control unit 30b drives the motors 13, the number of which is the maximum number calculated by the compressor number calculation unit 30a, at the rating. Specifically, the compressor drive control unit 30b gives a rated drive command to selected electric-motor inverters 14. A method for selecting an electric-motor inverter 14 to which the rated drive command is given will be described later.

The remaining input power calculation unit 30c subtracts power required to drive the motors 13, the number of which is the maximum number, from the input power indicated by the feed command value to obtain remaining input power. Specifically, the remaining input power is calculated from the following Equation (2). As in the above-described example, in a case where the information representing that the input power Win is 90 kW is received, when the rated power WcR of each of the combinations of the compressors 10 and the motors 13 is 40 kW, the resultant remaining input power ΔWin becomes 10 kW with the maximum number Nc calculated as 2.

[Math. 2]

$$\Delta Win = Win - WcR \times Nc \qquad (2)$$

where Win denotes the input power, and
WcR denotes the rated power, and
ΔWin denotes the remaining input power.

When the remaining input power is smaller than power corresponding to a minimum rotation speed of one of the motors 13, the feed control unit 30d allocates, to the remaining input power, some of the input power to be supplied to another one of the motors 13 to be driven at the rating to drive the one of the motors 13 at the minimum rotation speed or higher. Herein, the power corresponding to the minimum rotation speed of one of the motors 13 refers to power required to rotate the one of the motors 13 at the minimum rotation speed. Specifically, as in the above-described example, when the remaining input power is 10 kW, and the power corresponding to the minimum rotation speed of the motor 13 is 20 kW, at least 10 kW out of 40 kW to be supplied to the other one of the motors 13 to be driven at the rating is allocated to the remaining input power.

To be more specific, the feed control unit 30d preferably makes an allocation so as to make the remaining input power larger by predetermined power than the power corresponding to the minimum rotation speed of the one of the motors 13. That is, in the above-described example, since the remaining input power is 10 kW, power of 10 kW is allocated to the remaining input power to achieve the above-described power of 20 kW corresponding to the minimum rotation speed, but it is preferable to allocate 15 kW larger than the above to-be-allocated power by the predetermined power, for example, 5 kW, rather than exactly 10 kW. As a result, the remaining input power is larger by the predetermined power (5 kW in this case) than the power corresponding to the minimum rotation speed of the one of the motors 13, so that, even when the remaining input power decreases along with a decrease in the feed command value, the remaining input power does not immediately fall below the above-described power corresponding to the minimum rotation speed. Specifically, the remaining input power does not fall below the above-described power corresponding to the minimum rotation speed until the feed command value decreases by a value corresponding to the predetermined power. Therefore, even when the feed command value decreases, the motor 13 (compressor 10) driven with the remaining input power is not immediately stopped, and thus stable operation becomes possible.

The control unit for leveling compression 30e controls each of the electric-motor inverters 14 so as to level off drive times of the plurality of motors 13 (compressors 10). Specifically, for example, the drive time of each of the combinations of the compressors 10 and the motors 13 is measured, and a higher priority is given to a combination of a compressor 10 and a motor 13 with a shorter drive time. This priority is preferably updated at the initial launch of operation and when the maximum number Nc changes during operation. This prevents a situation where a combination of a compressor 10 and a motor 13 in operation is stopped, and then another combination of a compressor 10 and a motor 13 is driven, and thus stable operation becomes possible. As such a prioritization method, a method for avoiding, as much as possible, operation of a compressor 10 whose efficiency has become lower due to wear and the like is conceivable.

The expander number calculation unit 30f calculates the maximum number of generators 15 that are allowed to be driven at a rating based on the discharge command value. Specifically, a largest integer Ng that satisfies the following Inequality (3) is obtained. For example, in a case where information representing that demand power Wde is 85 kW is received as the discharge command value, when rated power WgR of each of the combinations of the expanders 12 and the generators 15 is 40 kW, the resultant maximum number Ng becomes 2. Herein, "rating" and "rated" each denote a state in which the expanders 12 and the generators 15 can be driven in an appropriate state (in one example, with optimum efficiency), and, more specifically, denote a state in which the expanders 12 and the generators are driven, for example, at a practically allowable maximum rotation speed.

[Math. 3]

$$Wde - WgR \times Ng > 0 \quad (3)$$

where Wde denotes the demand power, and
WgR denotes the rated power.

The expander drive control unit 30g drives the generators 15, the number of which is the maximum number calculated by the expander number calculation unit 30f, at the rating. Specifically, the expander drive control unit 30g gives a rated drive command to selected generator inverters 16. A method for selecting a generator inverter to which the rated drive command is given will be described later.

The remaining demand power calculation unit 30h subtracts output power obtained by driving the generators 15, the number of which is the maximum number Ng, from the demand power indicated by the discharge command value to obtain remaining demand power. Specifically, the remaining demand power $\Delta Wde$ is calculated from the following Equation (4). As in the above-described example, in a case where the information representing that the demand power Wde is 85 kW is received, when the rated power WgR of each of the generators 15 is 40 kW, the resultant remaining demand power $\Delta Wde$ becomes 5 kW with the maximum number Ng calculated as 2.

[Math. 4]

$$\Delta Wde = Wde - WgR \times Ng \quad (4)$$

where Wde denotes demand power,
WgR denotes rated power, and
$\Delta Wde$ denotes remaining power demand.

When the remaining demand power is smaller than power obtained by driving one of the generators 15 at the minimum rotation speed, the discharge control unit 30i allocates, to the remaining demand power, some of the demand power to be output from another one of the generators 15 to be driven at the rating to drive a combination of an expander and a generator 15 at the minimum rotation speed or higher. Specifically, as in the above-described example, when the remaining demand power is 5 kW, and the power corresponding to the minimum rotation speed of each of the combinations of the expanders 12 and the generators 15 is 10 kW, at least 5 kW out of 40 kW to be supplied to the other one of the generators 15 to be driven at the rating is allocated to the remaining demand power.

To be more specific, the discharge control unit 30i preferably makes an allocation so as to make the remaining demand power larger by predetermined power than the power corresponding to the minimum rotation speed of the one of the generators 15. That is, in the above-described example, since the remaining demand power is 5 kW, power of 5 kW is allocated to the remaining demand power to achieve the above-described power of 10 kW corresponding to the minimum rotation speed, but it is preferable to allocate 10 kW larger than the above to-be-allocated power by the predetermined power, for example, 5 kW, rather than exactly 5 kW. As a result, the remaining demand power is larger by the predetermined power (5 kW in this case) than the power corresponding to the minimum rotation speed of the one of the generators 15, so that, even when the discharge command value decreases, the remaining demand power does not immediately fall below the above-described power corresponding to the minimum rotation speed. Specifically, the remaining demand power does not fall below the above-described power corresponding to the minimum rotation speed until the discharge command value decreases by a value corresponding to the predetermined power. Therefore, even when the discharge command value decreases, the generator (expander 12) driven with the remaining demand power indicated by the discharge command value is not immediately stopped, and thus stable operation becomes possible.

The control unit for leveling expansion 30j controls each of the generator inverters 16 so as to level off drive times of the plurality of generators 15 (expanders 12). Specifically, for example, the drive time of each of the combinations of the expanders 12 and the generators 15 is measured, and a higher priority is given to a combination of an expander 12 and a generator 15 with a shorter drive time. This priority is preferably updated at the initial launch of operation and when the maximum number Ng changes during operation. This prevents a situation where a combination of an expander 12 and a generator 15 in operation is stopped, and then another combination of an expander 12 and a generator 15 is driven, and thus stable operation becomes possible. As such a prioritization method, a method for avoiding, as much as possible, operation of an expander 12 whose efficiency has become lower due to wear and the like is conceivable.

Figure 3:
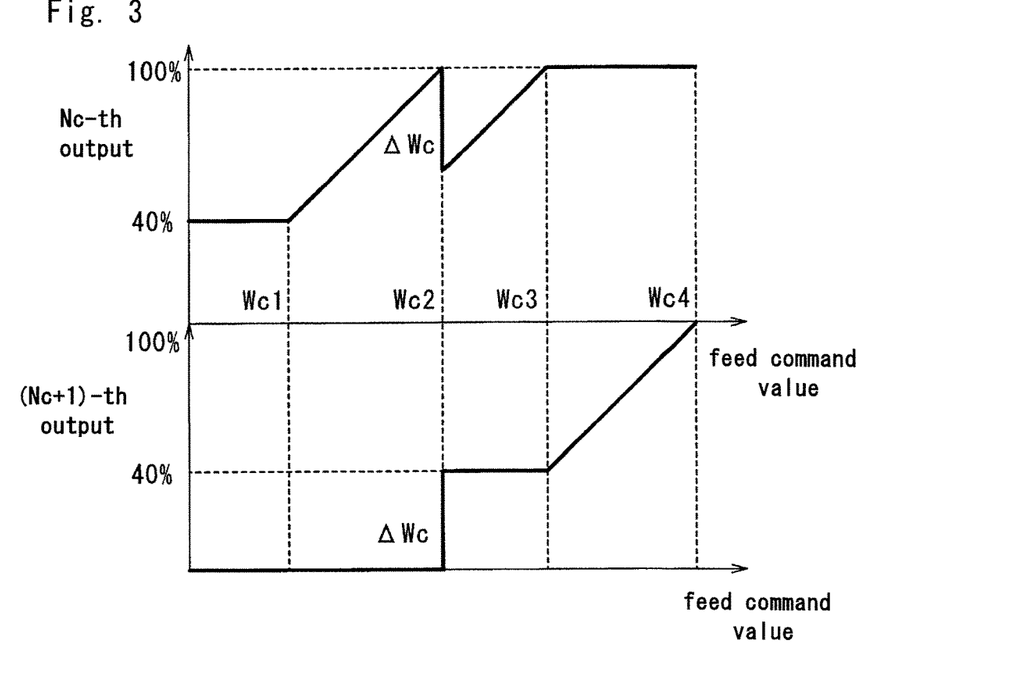
FIG. 3 is a graph relating to feed to the compressed air energy storage generator according to the embodiment.

FIG. 3 is a graph showing a relation between the feed command value and outputs of Nc-th and (Nc+1)-th motors 13. An abscissa axis of the graph represents the feed command value, that is, the input power, and an ordinate axis of the graph represents the respective outputs of the Nc-th and (Nc+1)-th motors 13.

The Nc-th motor 13 is driven at the minimum rotation speed until the feed command value reaches Wc1. That is, the Nc-th motor 13 is driven with power corresponding to the minimum rotation speed, and, according to the present embodiment, the output at this time is 40% of a rated output. At this time, the (Nc+1)-th motor 13 is not driven. When the feed command value from Wc1 to Wc2 increases the rotation speed of the Nc-th motor 13, that is, increases the output, and the feed command value Wc2 causes the output of the Nc-th motor 13 to reach the rating (100%), a predetermined feed command value ΔWc is allocated from the Nc-th motor 13 to the (Nc+1)-th motor 13. The predetermined feed command value ΔWc is equal to or greater than the power corresponding to the minimum rotation speed of the (Nc+1)-th motor 13. That is, according to the present embodiment, the feed command value ΔWc is allocated to the (Nc+1)-th motor 13 so that the output of the (Nc+1)-th motor 13 is at least 40% of the rating. The feed command value from Wc2 to Wc3 causes the (Nc+1)-th motor to be driven at the minimum rotation speed, that is, driven with the power corresponding to the minimum rotation speed, and, according to the present embodiment, the output at this time is 40% of the rated output. Then, at this time, the rotation speed of the Nc-th motor 13 is increased, that is, the output is increased. Then, the feed command value Wc3 causes the output of the Nc-th motor 13 to reach the rating (100%) again. The feed command value from Wc3 to Wc4 increases the rotation speed of the (Nc+1)-th motor 13, that is, increases the output. Then, when the feed command value Wc4 causes the output of the (Nc+1)-th motor 13 to reach the rating (100%), Nc is updated to (Nc+1).

Figure 4:
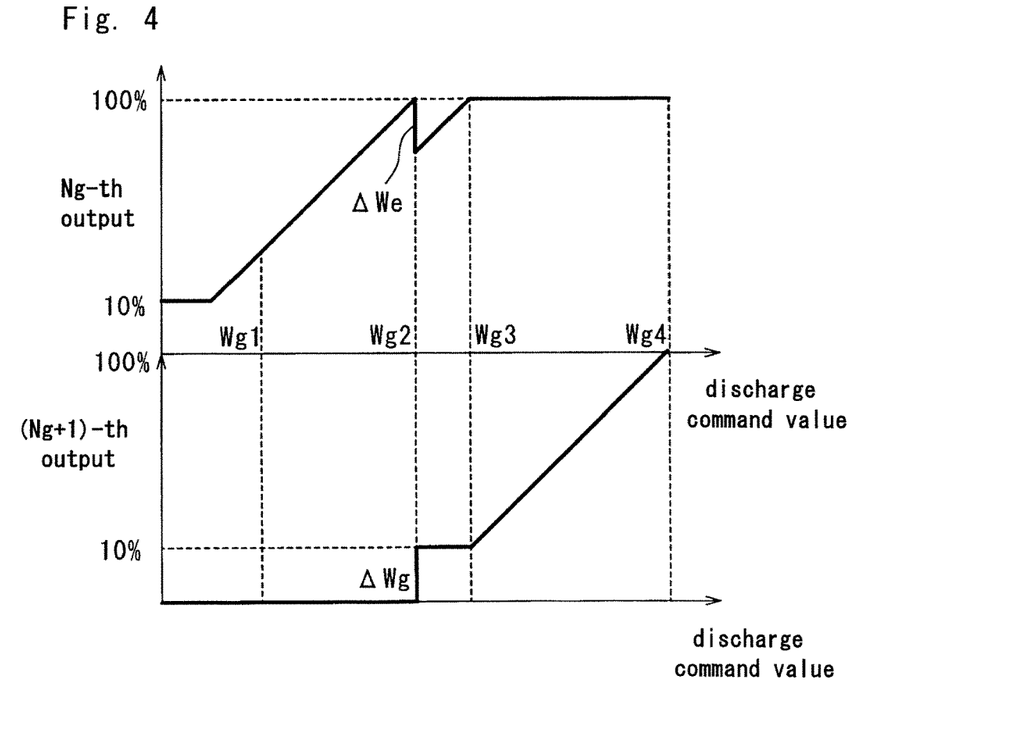
FIG. 4 is a graph relating to discharge from the compressed air energy storage generator according to the embodiment.

FIG. 4 is a graph showing a relation between the discharge command value and outputs of Ng-th and (Ng+1)-th generators 15. An abscissa axis of the graph represents the discharge command value, that is, the demand power, and an ordinate axis of the graph represents the respective outputs of the Ng-th and (Ng+1)-th generators 15.

The Ng-th generator 15 is driven at the minimum rotation speed until the discharge command value reaches Wg1. That is, the power corresponding to the minimum rotation speed is output, and, according to the present embodiment, the output at this time is 10% of the rated output. At this time, the (Ng+1)-th generator 15 is not driven. When the discharge command value from Wg1 to Wg2 increases the rotation speed of the Ng-th generator 15, that is, increases the output, and the discharge command value Wg2 causes the output of the Ng-th generator 15 to reach the rating (100%), a predetermined discharge command value ΔWg is allocated to the (Ng+1)-th generator 15. The predetermined discharge command value ΔWg is equal to or greater than the power corresponding to the minimum rotation speed of the (Ng+1)-th generator 15. That is, according to the present embodiment, the discharge command value ΔWg is allocated to the (Ng+1)-th generator 15 so that the output of the (Ng+1)-th generator 15 is at least 10% of the rating. The discharge command value from Wg2 to Wg3 causes the (Ng+1)-th generator 15 to be driven at the minimum rotation speed, that is, output the power corresponding to the minimum rotation speed, and, according to the present embodiment, the output at this time is 10% of the rated output. Then, at this time, the rotation speed of the Ng-th generator 15 is increased, that is, the output is increased. Then, the discharge command value Wg3 causes the output of the Ng-th generator 15 to reach the rating (100%) again. The discharge command value from Wg3 to Wg4 increases the rotation speed of the (Ng+1)-th generator 15, that is, increases the output. Then, when the discharge command value Wg4 causes the output of the (Ng+1)-th generator 15 to reach the rating (100%), Ng is updated to (Ng+1).

According to the present embodiment, it is possible to store energy such as renewable energy whose output fluctuates irregularly in the pressure accumulation tank 11 in the form of compressed air and to supply the compressed air to the expanders 12 on an as-needed basis to drive the generators 15 to generate power. In particular, it is possible to cause the compressor number calculation unit 30a to calculate the maximum number of motors 13 that are allowed to be driven at the rating based on the feed command value and to cause the compressor drive control unit 30b to drive the motors 13, the number of which is the maximum number, at the rating. Therefore, since the maximum number of motors 13 to be driven at the rating in an appropriate state can be secured, it is possible to increase charging efficiency (operation efficiency) of the CAES generator 1. Further, since the outputs of the motors 13, the number of which is the maximum number, are made constant with respect to the fluctuating input power, it is possible to make the number of motors 13 whose outputs fluctuate smaller, and thus stable operation becomes possible.

Further, according to the present embodiment, it is possible to cause the remaining input power calculation unit 30c to calculate the remaining input power and to cause the feed control unit 30d to make the remaining input power equal to or greater than the power corresponding to the minimum rotation speed of one of the motors 13, and thus the remaining input power can be used effectively. In a case where such control is not performed, and the remaining input power is less than the above-described power corresponding to the minimum rotation speed, even when the remaining input power is supplied to the one of the motors 13, the rotation speed of the motor 13 is equal to or less than the minimum allowable rotation speed, which fails to drive the motor 13 and in turn wastes the remaining input power. In particular, since the remaining input power fluctuates along with the fluctuation of the input power, it is preferable for the CAES generator 1 to be capable of effectively using the remaining input power in such a wide range.

Further, according to the present embodiment, since the drive times of the motors 13 (compressors 10) can be leveled off by the control unit for leveling compression 30e, it is prevented that only specific compressors 10 and motors 13 are driven and deteriorated. The configuration as described above where the compressors 10 and the motors to be driven are switched as needed tends to cause variations in drive time among the compressors 10 and the motors 13, and thus such a technique for allowing the drive times to be leveled off is particularly effective.

Further, according to the present embodiment, it is possible to cause the expander number calculation unit 30f to calculate the maximum number of generators 15 that are allowed to be driven at the rating based on the discharge command value and to cause the expander drive control unit 30g to drive the generators 15, the number of which is the maximum number, at the rating. Therefore, since the maximum number of generators 15 to be driven at the rating in an appropriate state can be secured, it is possible to increase the discharging efficiency (operation efficiency) of the CAES generator 1. Further, since the outputs of the generators 15, the number of which is the maximum number, are made constant with respect to the fluctuating input power, it is possible to make the number of generators 15 whose outputs fluctuate smaller, and thus stable operation becomes possible.

Further, according to the present embodiment, it is possible to cause the remaining demand power calculation unit 30h to calculate the remaining demand power and to cause the discharge control unit 30i to make the remaining demand power equal to or greater than the power corresponding to the minimum rotation speed of one of the generators 15, and thus power corresponding to the remaining demand power can be accurately output. Herein, the power corresponding to the minimum rotation speed of one of the generators 15 refers to power obtained by driving the generator 15 at the minimum rotation speed. In a case where such control is not performed, and the remaining demand power is less than the above-described power corresponding to the minimum rotation speed, even when the generator 15 is driven at the minimum rotation speed, power exceeding the remaining demand power is generated, and thus surplus power with respect to the discharge command value is developed. In particular, since the remaining demand power fluctuates with the condition of the consumer facility 3, it is preferable for the CAES generator 1 to be capable of handling such a wide range of remaining demand power.

Further, according to the present embodiment, since the drive times of the generators 15 (expanders 12) can be leveled off by the control unit for leveling expansion 30j, it is prevented that only specific expanders 12 and generators 15 are driven and deteriorated. The configuration as described above where the expanders 12 and the generators 15 to be driven are switched as needed tends to cause variations in drive time among the expanders 12 and the generators 15, and thus such a technique for allowing the drive times to be leveled off is particularly effective.

According to the embodiment and the modification of the embodiment described herein, anything that is steadily (or repeatedly) replenished with natural power, such as wind power, solar light, solar heat, wave power or tidal power, flowing water or tide, or the like, and utilizes energy that fluctuates irregularly may be within the scope of the target of renewable energy from which power is generated. Further, it is also possible to use commercial power as the input power that fluctuates due to that another apparatus in a factory consumes large power.

Further, in the present embodiment, the configuration where pluralities of compressors and expanders are provided has been given as an example, but, according to the present invention, it is only necessary to provide a plurality of compressors or expanders that are subject to the number control, and it is not necessary to provide a plurality of compressors or expanders that are not subject to the number control. Specifically, in the embodiment according to claim 1, a single expander may be provided, and in the embodiment according to claim 5, a single compressor may be provided.

As described above, although a description has been given of the specific embodiment and the modification of the embodiment according to the present invention, the present invention is not limited to such an embodiment or modification and may be variously modified and implemented within the scope of the present invention. For example, a suitable combination of the respective contents of the embodiments may be implemented as an embodiment of the present invention.

The invention claimed is:

1. A compressed air energy storage generator comprising:
a plurality of electric motors configured to be driven with input power that fluctuates;
a plurality of compressors configured to be driven by the electric motors to compress air;
a pressure accumulator configured to hold the compressed air discharged from the compressors;
an expander configured to be driven with the compressed air supplied from the pressure accumulator;
a generator configured to be driven by the expander to supply output power to a consumer facility;
an electric-motor inverter configured to change a rotation speed of each of the electric motors;
a feed command receiver configured to receive the input power as a feed command value before feeding the input power; and
a controller including a compressor number calculation unit and a compressor drive control unit, the compressor number calculation unit being configured to calculate a maximum number of electric motors that are allowed to be driven at a rating based on the feed command value, the compressor drive control unit being configured to drive the electric motors at the rating, wherein a number of the electric motors driven at the rating is the maximum number calculated by the compressor number calculation unit.

2. The compressed air energy storage generator according to claim 1, wherein
the controller further includes a remaining input power calculation unit and a feed control unit, the remaining input power calculation unit being configured to subtract power required to drive the electric motors, the number of which is the maximum number, from the input power indicated by the feed command value to obtain remaining input power, the feed control unit being configured to allocate, when the remaining input power is smaller than power corresponding to a minimum rotation speed of one of the electric motors, some of the input power to be supplied to another one of the electric motors to be driven at the rating to the remaining input power to drive the one of the electric motors at the minimum rotation speed or higher.

3. The compressed air energy storage generator according to claim 2, wherein
the feed control unit allocates, to the remaining input power, some of the input power to be supplied to the other one of the electric motors to be driven at the rating so as to make the remaining input power larger by predetermined power than the power corresponding to the minimum rotation speed of the one of the electric motors.

4. The compressed air energy storage generator according to claim 1, wherein
the controller further includes a control unit for leveling compression configured to control the electric-motor inverter to level off drive times of the plurality of electric motors.

5. The compressed air energy storage generator according to claim 2, wherein
the controller further includes a control unit for leveling compression configured to control the electric-motor inverter to level off drive times of the plurality of electric motors.

6. The compressed air energy storage generator according to claim 3, wherein
the controller further includes a control unit for leveling compression configured to control the electric-motor inverter to level off drive times of the plurality of electric motors.

7. A compressed air energy storage generator comprising:
an electric motor configured to be driven with input power;
a compressor configured to be driven by the electric motor to compress air;
a pressure accumulator configured to hold the compressed air discharged from the compressor;
a plurality of expanders configured to be driven with the compressed air supplied from the pressure accumulator;
a plurality of generators configured to be driven by the expanders to supply, to a consumer facility, output power that fluctuates;
a generator inverter configured to change a rotation speed of each of the generators;
a discharge command receiver configured to receive, from the consumer facility, demand power as a discharge command value before outputting the output power; and
a controller including an expander number calculation unit and an expander drive control unit, the expander number calculation unit being configured to calculate a maximum number of generators that are allowed to be driven at a rating based on the discharge command value, the expander drive control unit being configured to drive the generators at the rating, wherein a number of the generators driven at the rating is the maximum number calculated by the expander number calculation unit.

8. The compressed air energy storage generator according to claim 7, wherein
the controller further includes a remaining demand power calculation unit and a discharge control unit, the remaining demand power calculation unit being configured to subtract output power obtained by driving the generators, the number of which is the maximum number, from the demand power indicated by the demand command value to obtain remaining demand power, the discharge control unit being configured to allocate, when the remaining demand power is smaller than power corresponding to a minimum rotation speed of one of the generators, some of the demand power to be output by another one of the generators to be driven at the rating to the remaining demand power to drive the one of the generators at the minimum rotation speed or higher.

9. The compressed air energy storage generator according to claim 8, wherein
the discharge control unit allocates, to the remaining demand power, some of the demand power to be output by the other one of the generators to be driven at the rating so as to make the remaining demand power larger by predetermined power than the power corresponding to the minimum rotation speed of the one of the generators.

10. The compressed air energy storage generator according to claim 7, wherein
the controller further includes an control unit for leveling expansion configured to control the generator inverter to level off drive times of the plurality of generators.

11. The compressed air energy storage generator according to claim 8, wherein
the controller further includes an control unit for leveling expansion configured to control the generator inverter to level off drive times of the plurality of generators.

12. The compressed air energy storage generator according to claim 9, wherein
the controller further includes an control unit for leveling expansion configured to control the generator inverter to level off drive times of the plurality of generators.

* * * * *